(12) United States Patent
Kim

(10) Patent No.: US 9,810,244 B2
(45) Date of Patent: Nov. 7, 2017

(54) FLOW CONTROL VALVE FOR CONSTRUCTION MACHINERY

(75) Inventor: Jin-Wook Kim, Changwon-si (KR)

(73) Assignee: VOLVO CONSTRUCTION EQUIPMENT AB (SE)

(*) Notice: Subject to any disclaimer, the term of this patent is extended or adjusted under 35 U.S.C. 154(b) by 275 days.

(21) Appl. No.: 14/411,717

(22) PCT Filed: Jul. 19, 2012

(86) PCT No.: PCT/KR2012/005771
§ 371 (c)(1),
(2), (4) Date: Dec. 29, 2014

(87) PCT Pub. No.: WO2014/014146
PCT Pub. Date: Jan. 23, 2014

(65) Prior Publication Data
US 2015/0159678 A1 Jun. 11, 2015

(51) Int. Cl.
*F16D 31/02* (2006.01)
*F15B 11/024* (2006.01)
(Continued)

(52) U.S. Cl.
CPC .......... *F15B 11/024* (2013.01); *E02F 9/2267* (2013.01); *F15B 11/0406* (2013.01);
(Continued)

(58) Field of Classification Search
CPC . F15B 11/024; F15B 11/0406; F15B 11/0426; F15B 13/0403
See application file for complete search history.

(56) References Cited

U.S. PATENT DOCUMENTS

| 5,485,724 A | 1/1996 | Nozawa et al. |
| 2013/0032233 A1* | 2/2013 | Kim ............ E02F 9/2239 137/625 |

FOREIGN PATENT DOCUMENTS

| JP | 05-141402 A | 6/1993 |
| JP | 06-123123 A | 5/1994 |

(Continued)

OTHER PUBLICATIONS

International Search Report (in Korean and English) and Written Opinion (in Korean) for PCT/KR2012/005771, dated Mar. 4, 2013; ISA/KR.

*Primary Examiner* — Michael Leslie
*Assistant Examiner* — Daniel Collins
(74) *Attorney, Agent, or Firm* — Harness, Dickey & Pierce, P.L.C.

(57) ABSTRACT

Disclosed is a flow control valve for construction machinery, the flow control valve being adapted to reduce pressure loss due to flow on return to a hydraulic tank during the boom-down operation of a large-scale excavator. The flow control valve for construction machinery according to the present invention comprises: first and second boom spools which are respectively coupled to first and second boom valve blocks, and which regulate working fluid that is respectively supplied from first and second hydraulic pumps to a boom cylinder during direction reversal; a boom-up flow-adjusting means which, in direction reversal of the first and second boom spools for boom-up drive, supplies working fluid from the first and second hydraulic pumps into a large chamber of the boom cylinder via the first and second boom spools respectively, and causes part of the flow of working fluid from the second hydraulic pump to pass via the second boom spool so as to be combined with working fluid being supplied from the first hydraulic pump to the large chamber of the boom cylinder due to direction reversal of the first (Continued)

boom spool; and a boom-down flow-adjusting means which, in direction reversal of the first and second boom spools for boom-down drive, causes part of the flow of working fluid coming back from the large chamber of the boom cylinder to return to the hydraulic tank via the first and second boom spools respectively, and causes part of the flow of working fluid coming back from the large chamber of the boom cylinder to combine as respective regenerative flows for working fluid on the small chamber side of the boom cylinder.

3 Claims, 2 Drawing Sheets

(51) Int. Cl.
*E02F 9/22* (2006.01)
*F15B 13/02* (2006.01)
*F16K 11/07* (2006.01)
*F15B 11/04* (2006.01)
*F15B 11/042* (2006.01)
*F15B 13/04* (2006.01)

(52) U.S. Cl.
CPC ........ *F15B 11/0426* (2013.01); *F15B 13/021* (2013.01); *F15B 13/0403* (2013.01); *F16K 11/07* (2013.01); *F15B 2211/205* (2013.01); *F15B 2211/20576* (2013.01); *F15B 2211/30565* (2013.01); *F15B 2211/3133* (2013.01); *F15B 2211/31582* (2013.01); *F15B 2211/355* (2013.01); *Y10T 137/87193* (2015.04)

(56) References Cited

FOREIGN PATENT DOCUMENTS

| | | |
|---|---|---|
| JP | 08-277806 A | 10/1996 |
| JP | 2011-085191 A | 4/2011 |
| TW | WO2011145754 A1 * | 11/2011 ............ E02F 9/2239 |

* cited by examiner

FLOW CONTROL VALVE FOR CONSTRUCTION MACHINERY

TECHNICAL FIELD

The present invention relates to a flow rate control valve for a construction machine. More particularly, the present invention relates to a flow rate control valve for a construction machine, which can reduce a pressure loss due to a high flow rate of a hydraulic fluid that is returned to a hydraulic tank during a boom-down operation of a large-scale excavator.

BACKGROUND ART

In general, a control valve provided in a hydraulic system of a medium or large scale excavator includes a first boom spool and a second boom spool so that a manipulation performance during the boom-up operation can be secured and a pressure loss caused by the returning of a high flow rate of hydraulic fluid can be reduced during the boom-down operation.

The first boom spool is used as a main spool, and the second boom spool is used as an auxiliary spool for the purpose of confluence of the hydraulic fluid during the boom-up operation. On the other hand, since the high flow rate of hydraulic fluid is returned to a hydraulic tank during the boom-down operation, the first boom spool and the second boom spool serve as return passages.

Meanwhile, in the case where a combined operation of actuators such as an arm or bucket at an upstream side is performed, the unloading of the hydraulic fluid to the hydraulic tank from the hydraulic pump is blocked depending on the shift of spools of those actuators. For this reason, a pressure of the hydraulic pump rises during the boom-up operation, and an excessive pressure loss is caused by the returning of the high flow rate of hydraulic fluid during the boom-down operation, leading to an energy loss.

As shown in FIG. 1, flow rate control valve for a construction machine in accordance with the prior art includes:

a first boom valve block 1 connected to the first hydraulic pump (not shown);

a first boom spool 2 slidably coupled to the first boom valve block 1 and configured to be shifted by the supply of a pilot signal pressure to control the supply of the hydraulic fluid to a boom cylinder (not shown) from the first hydraulic pump so as to perform a boom-up or boom-down operation;

a poppet 37 mounted on one side of the inside of the first boom spool 2 to allow a part of the hydraulic fluid being fed back from the large changer of the boom cylinder to join a hydraulic fluid being supplied to a small chamber of the boom cylinder as a regenerative hydraulic fluid during the boom-down operation;

a second boom valve block 50 connected to a second hydraulic pump (not shown);

a second boom spool 51 slidably coupled to the boom second valve block 50 and configured to be shifted by the supply of the pilot signal pressure to control supply of the hydraulic fluid to the boom cylinder from the second hydraulic pump so as to perform the boom-up or boom-down operation; and a center block 40 interposed between the first boom valve block 1 and the second boom valve block 50 and configured to allow the hydraulic fluid being supplied from the second hydraulic pump by the shift of the second boom spool 51 of the second boom valve block 50 to join the hydraulic fluid being supplied to the boom cylinder from the first hydraulic pump by the shift of the first boom spool 2 of the first boom valve block 1.

The boom-up operation by the above-mentioned control valve will be described hereinafter.

When a remote control valve (RCV) is manipulated to perform the boom-up operation, a boom-up pilot signal pressure is simultaneously inputted to pilot ports 5 and 5a of the first and second boom valve blocks 1 and 50. The first boom spool 2 is shifted to the right on the drawing sheet by the boom-up pilot signal pressure inputted to the pilot port 5 of the first boom valve block 1. At this point, a valve spring 3 built in a cover 4 mounted at one side of the first boom valve block 1 receives a compressive force.

In this case, the hydraulic fluid in a pump passage 6 fluidically communicating with the first hydraulic pump causes a poppet 7 slidably coupled to the inside of a plug 9 to be lifted to the top on the drawing sheet, and then is transferred to a bridge passage 10. At this point, a valve spring 8 interposed between the plug 9 and the poppet 7 receives a compressive force.

The hydraulic fluid transferred to the bridge passage 10 is transferred to a passage 12 via a notch 11 of the shifted first boom spool 2, and thus causes a holding poppet 13 to be lifted to the top on the drawing sheet while exceeding an elastic force of a valve spring 14 mounted between a holding valve block 15 and the holding poppet 13. For this reason, the hydraulic fluid of the passage 12 is supplied to the large chamber of the boom cylinder via a cylinder passage 20 fluidically communicating with the passage 12.

In this case, a hydraulic fluid being fed back from the small chamber of the boom cylinder that is driven stretchably is returned to a tank passage 43 while passing through a cylinder port 21, a passage 26, and a notch 42 of the shifted first boom spool 2 in this order.

At this point, when occurs an excessive pressure due to the returning of the hydraulic fluid to the tank passage 43, the hydraulic fluid being returned to the boom cylinder is returned to the tank passage 43 by a relief valve 22 mounted in the cylinder port 21 so that a pressure of the boom cylinder side can be maintained constantly.

Meanwhile, the boom-up pilot signal pressure is introduced into the pilot port 5 of the first boom valve block 1, and simultaneously the second boom spool 51 is shifted to the right on the drawing sheet by the boom-up pilot signal pressure inputted to the pilot port 5a of the second boom valve block 50. At this point, a valve spring 3a built in a cover 4a mounted at one side of the second boom valve block 50 receives a compressive force.

In this case, the hydraulic fluid in a pump passage 6a fluidically communicating with the second hydraulic pump causes a poppet 7a slidably coupled to the inside of a plug 9a to be pressingly lowered to the bottom on the drawing sheet, and then is transferred to a bridge passage 10a. At this point, a valve spring 8a interposed between the plug 9a and the poppet 7a receives a compressive force.

The hydraulic fluid transferred to the bridge passage 10a is transferred to a passage 12a via a notch 11a of the shifted second boom spool 51. In this case, since an outer end of the passage 12a is blocked by a flange 53, the hydraulic fluid of the passage 12a is transferred toward the center block 40 through a passage 52 of an inner end of the passage 12. In other words, the hydraulic fluid of the passage 52 passes through a passage "a" indicated by an arrow to cause the poppet 44 of the center block 40 to be lifted to the top on the drawing sheet. At this point, the valve spring 45 interposed between the center block 40 and the poppet 44 receives a compressive force.

For this reason, since the hydraulic fluid passing through the inside of the poppet 44 from the passage 52 is supplied to a passage 23 of the first boom valve block 1 via the passage "a", it joins the hydraulic fluid supplied to the passage 12 from the first hydraulic pump by the shift of the first boom spool 2 and then is supplied to the large chamber of the boom cylinder.

In this case, the medium scale construction machine blocks the outer end of the passage 12*a* by the flange 53 to prevent the hydraulic fluid of the passage 12*a* from joining the hydraulic fluid supplied to the large chamber of the boom cylinder. On the other hand, the large scale construction machine allows the hydraulic fluid of the passage 12*a* to join the hydraulic fluid supplied to the large chamber of the boom cylinder by removing the flange 53.

The boom-down operation by the above-mentioned control valve will be described hereinafter.

When the remote control valve (RCV) is manipulated to perform the boom-down operation, a boom-down pilot signal pressure is simultaneously inputted to pilot ports 24 and 24*a* of the first and second boom valve blocks 1 and 50, and a port 16 of the holding valve block 15 of the first boom valve block 1. The first boom spool 2 is shifted to the left on the drawing sheet by the boom-down pilot signal pressure inputted to the pilot port 24 of the first boom valve block 1. At this point, the valve spring 3 built in the cover 4 mounted at one side of the first boom valve block 1 receives a compressive force.

In this case, the hydraulic fluid in the pump passage 6 fluidically communicating with the first hydraulic pump causes the poppet 7 slidably coupled to the inside of the plug 9 to be lifted to the top on the drawing sheet, and then is transferred to the bridge passage 10. At this point, the valve spring 8 interposed between the plug 9 and the poppet 7 receives a compressive force.

The hydraulic fluid transferred to the bridge passage 10 is transferred to a passage 26 via a notch 25 of the shifted first boom spool 2, and thus is supplied to the small chamber of the boom cylinder via the cylinder port 21 of fluidically communicating with the passage 26. At this point, the hydraulic fluid being fed back from the large chamber of the boom cylinder that is driven retractably is transferred to the cylinder passage 20 of the first boom valve block 1.

Meanwhile, the boom-down pilot signal pressure is introduced into the pilot port 24 of the first boom valve block 1, and simultaneously the second boom spool 51 is shifted to the left on the drawing sheet by the boom-down pilot signal pressure inputted to the pilot port 24*a* of the second boom valve block 50. At this point, the valve spring 3*a* built in the cover 4*a* mounted at one side of the second boom valve block 50 receives a compressive force.

In this case, the hydraulic fluid in the pump passage 6*a* fluidically communicating with the second hydraulic pump causes the poppet 7*a* to be pressingly lowered to the bottom on the drawing sheet while exceeding the elastic force of the valve spring 8*a* interposed between the plug 9*a* and the poppet 7*a* slidably coupled to the inside of the plug 9*a*, and then is transferred to the bridge passage 10*a*.

In this case, the hydraulic fluid transferred to the bridge passage 10*a* cannot be transferred to the passage 26*a* since a separate passage for fluidically communicating the bridge passage 10*a* and the passage 26*a* with each other is not formed. The reason for this is that a high flow rate of hydraulic fluid is returned to the hydraulic tank from the large chamber of the boom cylinder and simultaneously the boom drops down by its own weight during the boom-down operation, the hydraulic fluid need not to be supplied to the second boom valve block 50 side. In addition, the hydraulic fluid being fed back from the large chamber of the boom cylinder is blocked from supplied to the second boom valve block 50 since the outer end of the passage 12*a* is closed by the flange 53.

Thus, the hydraulic fluids being fed back from the large chambers of two boom cylinders of the excavator are all introduced into the cylinder passage 20 of the first boom valve block 1 during the boom-down operation.

The boom-down pilot signal pressure inputted to the port 16 of the holding valve block 15 exceeds an elastic force of a valve spring 19 to cause a spool 18 to be shifted to the left on the drawing.

For this reason, a high pressure hydraulic fluid of the cylinder passage 20 sequentially passes through an orifice 27 of the holding poppet 13, an upper portion of the holding poppet 13, and a notch of the spool 18 in this order, and thus is partly drained to the hydraulic tank through a drain port 17. At this point, since the upper portion of the holding poppet 13 is in a low pressure state, the high pressure hydraulic fluid of the cylinder passage 20 cause the holding poppet 13 to be lifted to the top on the drawing sheet while exceeding the elastic force of the valve spring 14.

Resultantly, the hydraulic fluid of the cylinder passage 20 is transferred to a passage 30 via the passage 12 and a notch 29 of the shifted first boom spool 2 in this order. A part of the hydraulic fluid transferred to the passage 30 causes the valve spring 38 to be pressed while passing through a passage (not shown) formed axially in the first boom spool 2 via a passage 36 formed in the first boom spool 2, and thus allows the poppet 37 to be shifted to the right on the drawing sheet while exceeding an elastic force of the valve spring 38. For this reason, the part of the hydraulic fluid of the passage 30 joins the hydraulic fluid of the port 26, i.e., the hydraulic fluid being supplied to the small chamber of the boom cylinder as a regenerative hydraulic fluid via a passage 39.

In addition, a part of the hydraulic fluid transferred to the passage 30 is transferred to a passage 31 of the center block 40, and then maintains a balance with an elastic force of a valve spring 33 that elastically supports the poppet 32 slidably movable in a boom booster plug 34. At this point, the part of the hydraulic fluid of the passage 31 flow out of an orifice 46 and is returned to a tank passage 35.

In this case, if the pressure of the large chamber side of the boom cylinder is higher than a predetermined elastic force of the valve spring 33, the booster poppet 32 is shifted to the left on the drawing sheet. As a result, the hydraulic fluids being fed back from the large chambers of the boom cylinders are all returned to the tank passage 35.

In the meantime, since the boom drops down by its own weight during the boom-down operation, a back pressure can be generated by the booster poppet 32 so as to control the boom drop speed.

In case of the conventional flow rate control valve as described above, the hydraulic fluids being fed back from the large chambers of two boom cylinders are all returned to the tank passage 35 after passing through the cylinder passage 20, the notch 29, the passage 12, the passage 31, and the booster poppet 32 in this order.

In particular, in case of a large scale construction machine, since a high flow rate of hydraulic fluid is returned from the large chambers of two boom cylinders, it causes an excessive pressure loss while passing through each passage, each spool, each poppet and the like of the control valve, resulting in an energy loss.

Further, a problem associated with the heat generation caused by the excessive pressure loss and a decrease in the boom-down operation speed lead to deterioration of fuel efficiency and manipulability.

Therefore, there is a need for a flow rate control valve which can prevent a pressure loss from being caused and increase the boom-down operation speed during the boom-down operation in the medium or large scale construction machine.

DISCLOSURE

Technical Problem

Accordingly, the present invention has been made to solve the aforementioned problems occurring in the prior art, and it is an object of the present invention to provide a flow rate control valve for a construction machine in which the amount of a hydraulic fluid being returned to a hydraulic tank is reduced by separation and regeneration during the boom-down operation of a large-scale excavator so that a heat generation or an energy loss caused by an excessive pressure loss can be reduced, thereby increasing the fuel efficiency.

Another object of the present invention is to provide a flow rate control valve for a construction machine in which the boom-down operation speed according to the dropping of the boom by its own weight can be increased, thereby improving the manipulability.

Technical Solution

To achieve the above and other objects, in accordance with an embodiment of the present invention, there is provided a flow rate control valve for a construction machine, which is configured to control the supply of a hydraulic fluid to a hydraulic actuator from first and second hydraulic pumps, the control valve including:

a first boom valve block connected to the first hydraulic pump;

a second boom valve block connected to the second hydraulic pump;

a first boom spool slidably coupled to the first boom valve block and configured to be shifted by the supply of a pilot signal pressure to control the supply of the hydraulic fluid to a boom cylinder from the first hydraulic pump so as to perform a boom-up or boom-down operation;

a second boom spool slidably coupled to the boom second valve block and configured to be shifted by the supply of the pilot signal pressure to control the supply of the hydraulic fluid to the boom cylinder from the second hydraulic pump so as to perform the boom-up or boom-down operation;

a boom-up flow rate adjustment means configured to supply the hydraulic fluid from the first and second hydraulic pumps to a large chamber of the boom cylinder via the first and second boom spools and allow a part of the hydraulic fluid from the second hydraulic pump to join the hydraulic fluid being supplied from the first hydraulic pump to the large chamber of the boom cylinder via the second boom spool through the shift of the first boom spool when the first and second boom spools are shifted to perform the boom-up operation; and a boom-down flow rate adjustment means configured to allow a part of the hydraulic fluid being fed back from the large chamber of the boom cylinder to be returned to the hydraulic tank via the first and second boom spools and allow a part of the hydraulic fluid being fed back from the large chamber of the boom cylinder to join the hydraulic fluid on a small chamber side of the boom cylinder as a regenerative hydraulic fluid when the first and second boom spools are shifted to perform the boom-down operation.

The boom-up flow rate adjustment means may allow the part of the hydraulic fluid from the second hydraulic pump to join the hydraulic fluid at the outside via the shifted second boom spool so as to be supplied to the large chamber of the boom cylinder, and allow the part of the hydraulic fluid from the second hydraulic pump to be supplied through a confluence line hat fluidically communicates with a cylinder passage in the first boom valve block 1 via a poppet 56 installed in the second boom valve block 50 to cause the part of the hydraulic fluid to join the hydraulic fluid that is supplied from the first hydraulic pump to the large chamber of the boom cylinder via the first boom spool.

The boom-down flow rate adjustment means may include:

a regenerating poppet mounted on one side of the inside of the first boom spool to allow the part of the hydraulic fluid being fed back from the large changer of the boom cylinder to join the hydraulic fluid being supplied to the small chamber of the boom cylinder as the regenerative hydraulic fluid when the first boom spool 2 is shifted;

a boom booster poppet mounted on the first boom valve block 1 in such a manner as to be positioned on a path along which the hydraulic fluid being fed back from the larger chamber of the boom cylinder returns to the hydraulic tank via the first boom spool during the boom-down operation, and configured to generate a back pressure to control the boom drop speed to prevent a boom from dropping down abruptly by its own weight during the boom-down operation; and a boom booster poppet mounted on the second boom valve block in such a manner as to be positioned on a path along which the hydraulic fluid being fed back from the larger chamber of the boom cylinder returns to the hydraulic tank via the second boom spool during the boom-down operation, and configured to generate a back pressure to control the boom drop speed to prevent a boom from dropping down abruptly by its own weight during the boom-down operation.

The boom-down flow rate adjustment means may include a block regenerating poppet mounted in a passage formed on an inlet side of the boom booster poppet on the boom first valve block side, and configured to allow the part of the hydraulic fluid being fed back from the large chamber of the boom cylinder to join the hydraulic fluid being supplied to the small chamber of the boom cylinder as the regenerative hydraulic fluid during the boom-down operation.

The boom booster poppet on the second boom valve block side may be mounted in a position in which a relief valve is mounted to return the hydraulic fluid to the hydraulic tank when an excessive pressure occurs due to the returned hydraulic fluid when the hydraulic fluid being fed back from the large chamber of the boom cylinder is returned to the hydraulic tank during the boom-down operation.

Advantageous Effect

The flow rate control valve for a construction machine in accordance with the present invention as constructed above has the following advantages.

It is possible to prevent an excessive pressure loss due to the returning of a high flow rate of hydraulic fluid from the boom cylinder only through the use of the first boom valve block during the boom-down operation of a medium or large scale excavator, and the hydraulic fluid being returned can be regenerated to improve a fuel efficiency. In addition, each of the boom booster poppets increases the boom-down operation speed, thereby improving manipulability.

BRIEF DESCRIPTION OF THE DRAWINGS

The above objects, other features and advantages of the present invention will become more apparent by describing the preferred embodiments thereof with reference to the accompanying drawings, in which.

EXPLANATION ON REFERENCE NUMERALS OF MAIN ELEMENTS IN THE DRAWINGS

Figure 1:
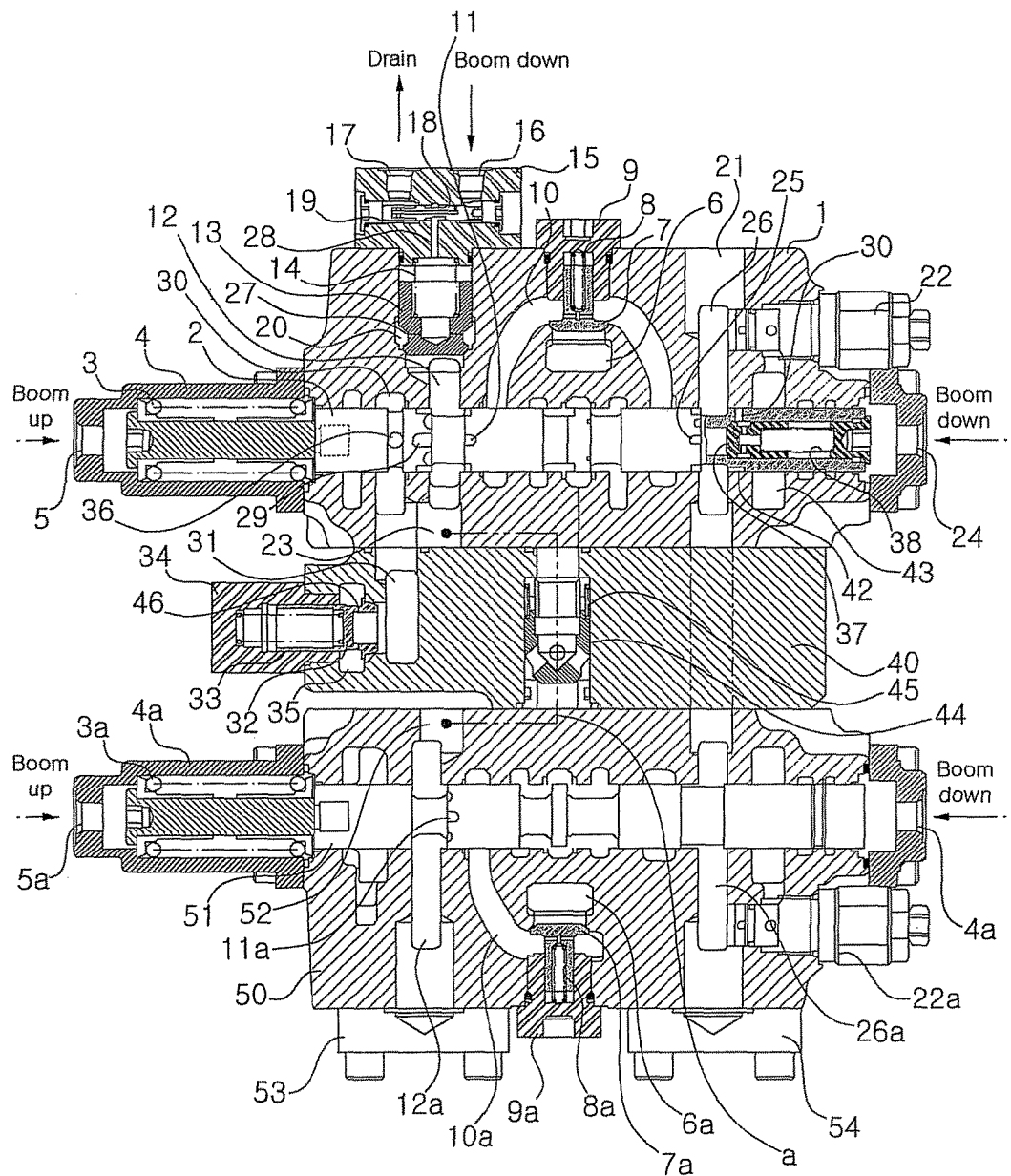
FIG. 1 is a cross-section view showing a flow rate control valve for a construction machine in accordance with the prior art.

1: first boom valve block
3: valve spring
5: pilot port
7: poppet
9: plug
11: notch
13: holding poppet
15: holding valve block
17: drain port
19: valve spring
21: cylinder port
25: notch
27: orifice
29: notch
31: passage
33: valve spring
35: tank passage
37: poppet
39: passage
43: tank passage
51: second boom valve block
53: flange
55: cylinder port

PREFERRED EMBODIMENTS OF THE INVENTION

Now, a flow rate control valve for a construction machine in accordance with a preferred embodiment of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

Figure 2:
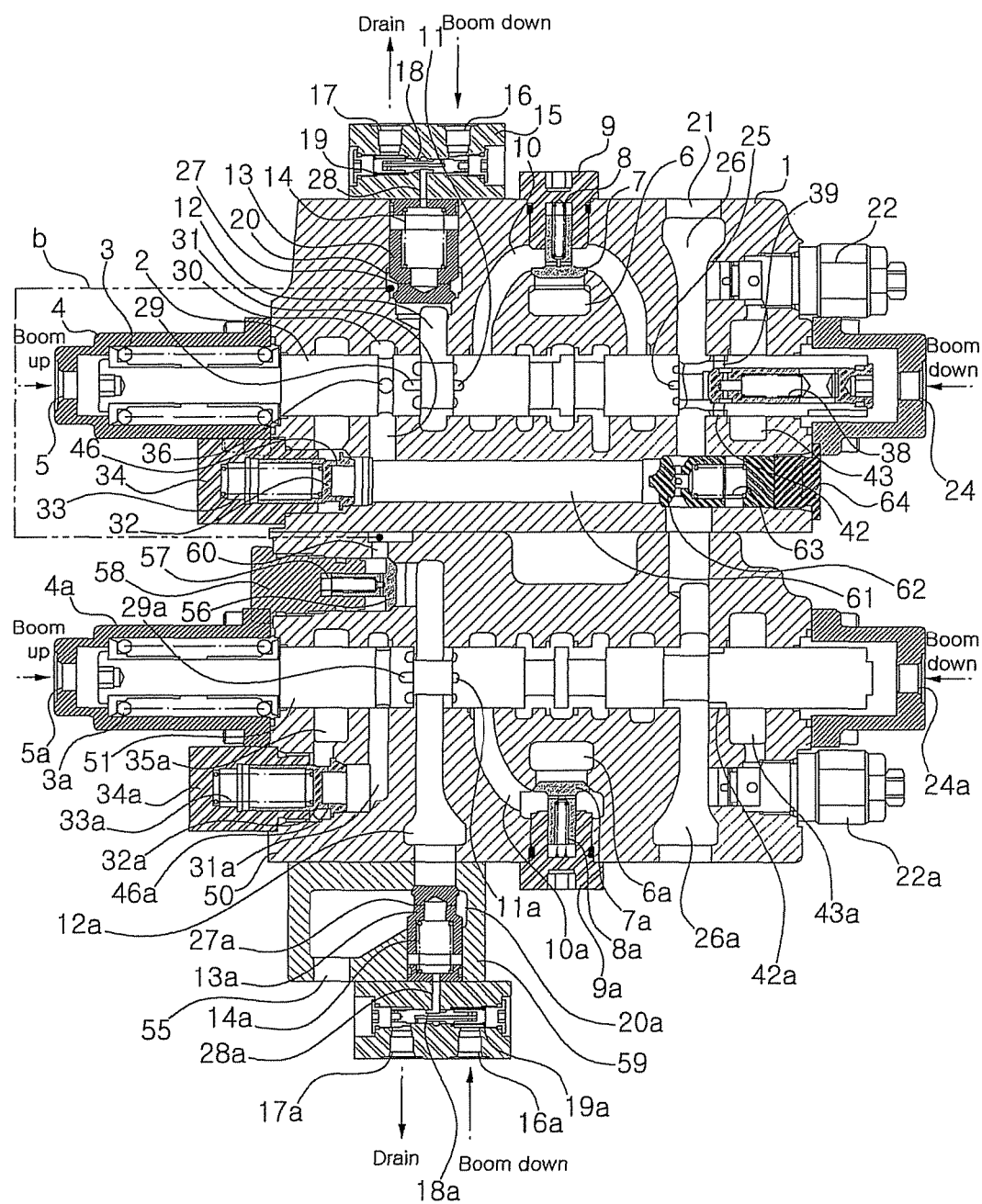
FIG. 2 is a cross-section view showing a flow rate control valve for a construction machine in accordance with a preferred embodiment of the present invention.

FIG. 2 is a cross-section view showing a flow rate control valve for a construction machine in accordance with a preferred embodiment of the present invention.

Referring to FIG. 2, the flow rate control valve for a construction machine in accordance with a preferred embodiment of the present invention, which is configured to control the supply of a hydraulic fluid to a hydraulic actuator from first and second hydraulic pumps, includes:

a first boom valve block 1 connected to the first hydraulic pump (not shown);

a second boom valve block 50 connected to the second hydraulic pump (not shown);

a first boom spool 2 slidably coupled to the first boom valve block 1 and configured to be shifted by the supply of a pilot signal pressure to control the supply of the hydraulic fluid to a boom cylinder (not shown) from the first hydraulic pump so as to perform a boom-up or boom-down operation;

a second boom spool 51 slidably coupled to the boom second valve block 50 and configured to be shifted by the supply of the pilot signal pressure to control the hydraulic fluid being supplied from the second hydraulic pump to the boom cylinder so as to perform the boom-up or boom-down operation;

a boom-up flow rate adjustment means configured to supply the hydraulic fluid from the first and second hydraulic pumps to a large chamber of the boom cylinder via the first and second boom spools 2 and 51 and allow a part of the hydraulic fluid from the second hydraulic pump to join the hydraulic fluid being supplied from the first hydraulic pump to the large chamber of the boom cylinder via the second boom spool 51 through the shift of the first boom spool 2 when the first and second boom spools 2 and 51 are shifted to perform the boom-up operation; and a boom-down flow rate adjustment means configured to allow a part of the hydraulic fluid being fed back from the large chamber of the boom cylinder to be returned to the hydraulic tank through the first and second boom spools and allow a part of the hydraulic fluid being fed back from the large chamber of the boom cylinder to join the hydraulic fluid on a small chamber side of the boom cylinder as a regenerative hydraulic fluid when the first and second boom spools 2 and 51 are shifted to perform the boom-down operation.

The boom-up flow rate adjustment means allows the part of the hydraulic fluid from the second hydraulic pump to join the hydraulic fluid at the outside via the shifted second boom spool 51 so as to be supplied to the large chamber of the boom cylinder, and allows the part of the hydraulic fluid from the second hydraulic pump to be supplied through a confluence line b that fluidically communicates with a cylinder passage 20 in the first boom valve block 1 via a poppet 56 installed in the second boom valve block 50 to cause the part of the hydraulic fluid to join the hydraulic fluid that is supplied from the first hydraulic pump to the large chamber of the boom cylinder via the first boom spool 2.

The boom-down flow rate adjustment means includes:

a regenerating poppet 37 mounted on one side of the inside of the first boom spool 2 to allow the part of the hydraulic fluid being fed back from the large changer of the boom cylinder to join the hydraulic fluid being supplied to the small chamber of the boom cylinder as the regenerative hydraulic fluid when the first boom spool 2 is shifted;

a boom booster poppet 32 mounted on the first boom valve block 1 in such a manner as to be positioned on a path along which the hydraulic fluid being fed back from the larger chamber of the boom cylinder returns to the hydraulic tank via the first boom spool 2 during the boom-down operation, and configured to generate a back pressure to control the boom drop speed to prevent a boom from dropping down abruptly by its own weight during the boom-down operation; and a boom booster poppet 32a mounted on the second boom valve block 50 in such a manner as to be positioned on a path along which the hydraulic fluid being fed back from the larger chamber of the boom cylinder returns to the hydraulic tank via the second boom spool 51 during the boom-down operation, and configured to generate a back pressure to control the boom drop speed to prevent a boom from dropping down abruptly by its own weight during the boom-down operation.

The boom-down flow rate adjustment means includes a block regenerating poppet 62 mounted in a passage 61 formed on an inlet side of the boom booster poppet 32 on the boom first valve block 1 side, and configured to allow the part of the hydraulic fluid being fed back from the large chamber of the boom cylinder to join the hydraulic fluid being supplied to the small chamber of the boom cylinder as the regenerative hydraulic fluid during the boom-down operation.

The boom booster poppet 32a on the second boom valve block 50 side is mounted in a position in which a relief valve is mounted to return the hydraulic fluid to the hydraulic tank when an excessive pressure occurs due to the returned hydraulic fluid when the hydraulic fluid being fed back from the large chamber of the boom cylinder is returned to the hydraulic tank during the boom-down operation.

Hereinafter, a use example of a flow rate control valve for a construction machine in accordance with an embodiment of the present invention will be described in detail with reference to the accompanying drawings.

The boom-up operation by the above-mentioned control valve will be described hereinafter.

When a remote control valve is manipulated to perform the boom-up operation, a boom-up pilot signal pressure is simultaneously inputted to pilot ports 5 and 5a of the first and second boom valve blocks 1 and 50. The first boom spool 2 is shifted to the right on the drawing sheet by the boom-up pilot signal pressure inputted to the pilot port 5 of the first boom valve block 1. At this point, a valve spring 3 built in a cover 4 mounted at one side of the first boom valve block 1 receives a compressive force.

In this case, the hydraulic fluid in a pump passage 6 fluidically communicating with the first hydraulic pump causes a poppet 7 slidably coupled to the inside of a plug 9 to be lifted to the top on the drawing sheet, and then is transferred to a bridge passage 10. At this point, a valve spring 8 interposed between the plug 9 and the poppet 7 receives a compressive force.

The hydraulic fluid transferred to the bridge passage 10 is transferred to a passage 12 via a notch 11 of the shifted first boom spool 2, and thus causes a holding poppet 13 to be lifted to the top on the drawing sheet while exceeding an elastic force of a valve spring 14 mounted between a holding valve block 15 and the holding poppet 13. For this reason, the hydraulic fluid of the passage 12 is supplied to the large chamber of the boom cylinder via a cylinder passage 20 fluidically communicating with the passage 12.

In this case, a hydraulic fluid being fed back from the small chamber of the boom cylinder that is driven stretchably is returned to a tank passage 43 while passing through a cylinder port 21, a passage 26, and a notch 42 of the shifted first boom spool 2 in this order. At this point, a configuration in which when occurs an excessive pressure due to the returned hydraulic fluid, the hydraulic fluid is returned to the tank passage 43 by a relief valve 22 mounted in the passage 26, is the same as that shown in FIG. 1.

Meanwhile, the boom-up pilot signal pressure is introduced into the pilot port 5 of the first boom valve block 1, and simultaneously the second boom spool 51 is shifted to the right on the drawing sheet by the boom-up pilot signal pressure inputted to the pilot port 5a of the second boom valve block 50. At this point, a valve spring 3a built in a cover 4a mounted at one side of the second boom valve block 50 receives a compressive force.

In this case, the hydraulic fluid in a pump passage 6a fluidically communicating with the second hydraulic pump causes a poppet 7a slidably coupled to the inside of a plug 9a to be pressingly lowered to the bottom on the drawing sheet, and then is transferred to a bridge passage 10a. At this point, a valve spring 8a interposed between the plug 9a and the poppet 7a receives a compressive force.

The hydraulic fluid transferred to the bridge passage 10a is transferred to a passage 12a via a notch 11a of the shifted second boom spool 51. The hydraulic fluid transferred to the passage 12a is transferred to an inlet side of a holding poppet 13a of a holding block 59 to cause a holding poppet 13a to be pressingly lowered to the bottom on the drawing sheet while exceeding an elastic force of a valve spring 14a mounted between a holding valve block 15a and the holding poppet 13a. For this reason, a part of the hydraulic fluid of the passage 12a joins the hydraulic fluid at the outside through a cylinder port 55 and is supplied to the large chamber of the boom cylinder. In this case, a hydraulic fluid being fed back from the small chamber of the boom cylinder is returned to a tank passage 43a via a notch 42a of the shifted second boom spool 51 through a cylinder port 26a.

In the meantime, the part of the hydraulic fluid of the passage 12a causes a holding poppet 56 to be pressingly shifted to the left the drawing sheet while exceeding an elastic force of a valve spring 57 mounted between the poppet 56 and a plug 58. For this reason, the part of the hydraulic fluid of the passage 12a is transferred to a passage 60 and then is transferred to the cylinder passage 20 of the first boom valve block 1 via the passage b indicated by an arrow. In other words, the hydraulic fluid supplied from the second hydraulic pump by the shift of the second boom spool 51 of the second boom valve block 50 joins the hydraulic fluid supplied from the first hydraulic pump by the shift of the first boom spool 2 of the first boom valve block 1, and is supplied to the large chamber of the boom cylinder.

As mentioned above, the inner hydraulic fluid supplied from the first hydraulic pump by the shift of the first boom spool 2 of the first boom valve block 1, the inner hydraulic fluid supplied from the second hydraulic pump by the shift of the second boom spool 51 of the second boom valve block 50, and the hydraulic fluid that joins the hydraulic fluid at the outside and is supplied are separated from one another and are supplied to the large chamber of the boom cylinder during the boom-up operation of the large-scale excavator.

Resultantly, it is possible to reduce a pressure loss caused by the supply of a high flow rate of hydraulic fluid needed during the boom-up operation to the large chamber at a time only through the use of the first boom valve block 1. In addition, since the confluence poppet 56 built in the second boom valve block 50 is used instead of the center block 40 of the prior art shown in FIG. 1, the control valve can be designed compactly.

The boom-down operation by the above-mentioned control valve will be described hereinafter.

When the remote control valve is manipulated to perform the boom-down operation, a boom-down pilot signal pressure is simultaneously inputted to pilot ports 24 and 24a of the first and second boom valve blocks 1 and 50, and ports 16 and 6a of the holding valve blocks 15 and 15a of the first and second boom valve blocks 1 and 50.

The first boom spool 2 is shifted to the left on the drawing sheet by the boom-down pilot signal pressure inputted to the pilot port 24 of the first boom valve block 1. At this point, the valve spring 3 built in the cover 4 mounted at one side of the first boom valve block 1 receives a compressive force.

In this case, the hydraulic fluid in the pump passage 6 fluidically communicating with the first hydraulic pump causes the poppet 7 slidably coupled to the inside of the plug 9 to be lifted to the top on the drawing sheet, and then is transferred to the bridge passage 10. At this point, the valve spring 8 interposed between the plug 9 and the poppet 7 receives a compressive force.

The hydraulic fluid transferred to the bridge passage 10 is transferred to a passage 26 via a notch 25 of the shifted first boom spool 2, and thus is supplied to the small chamber of the boom cylinder via the cylinder port 21 of fluidically communicating with the passage 26. At this point, the hydraulic fluid being fed back from the large chamber of the boom cylinder that is driven retractably is transferred to the cylinder passage 20 of the first boom valve block 1.

Meanwhile, the boom-down pilot signal pressure is introduced into the pilot port 24 of the first boom valve block 1, and simultaneously the second boom spool 51 is shifted to the left on the drawing sheet by the boom-down pilot signal pressure inputted to the pilot port 24a of the second boom valve block 50. At this point, the valve spring 3a built in the cover 4a mounted at one side of the second boom valve block 50 receives a compressive force.

In this case, the hydraulic fluid in the pump passage 6a fluidically communicating with the second hydraulic pump causes the poppet 7a to be pressingly lowered to the bottom on the drawing sheet while exceeding the elastic force of the valve spring 8a interposed between the plug 9a and the poppet 7a slidably coupled to the inside of the plug 9a, and then is transferred to the bridge passage 10a.

In this case, the hydraulic fluid transferred to the bridge passage 10a cannot be transferred to the passage 26a since a separate passage for fluidically communicating the bridge passage 10a and the passage 26a with each other is not formed. The reason for this is that a high flow rate of hydraulic fluid is returned to the hydraulic tank from the large chamber of the boom cylinder and simultaneously the boom drops down by its own weight during the boom-down operation, the hydraulic fluid need not to be supplied to the second boom valve block 50 side.

The boom-down pilot signal pressure inputted to the port 16 of the holding valve block 15 exceeds an elastic force of a valve spring 19 to cause a spool 18 to be shifted to the left on the drawing.

For this reason, a high pressure hydraulic fluid of the cylinder passage 20 sequentially passes through an orifice 27 of the holding poppet 13, an upper portion of the holding poppet 13, and a notch of the spool 18 in this order, and thus is partly drained to the hydraulic tank through a drain port 17. At this point, since the upper portion of the holding poppet 13 is in a low pressure state, the high pressure hydraulic fluid of the cylinder passage 20 cause the holding poppet 13 to be lifted to the top on the drawing sheet while exceeding the elastic force of the valve spring 14.

Resultantly, the hydraulic fluid of the cylinder passage 20 is transferred to a passage 30 via the passage 12 and a notch 29 of the shifted first boom spool 2 in this order. A part of the hydraulic fluid transferred to the passage 30 causes the valve spring 38 to be pressed while passing through a passage (not shown) formed axially in the first boom spool 2 via a passage 36 fluidically communicating with the passage 30, and thus allows the poppet 37 to be shifted to the right on the drawing sheet while exceeding an elastic force of the valve spring 38. For this reason, the part of the hydraulic fluid of the passage 30 joins the hydraulic fluid of the port 26, i.e., the hydraulic fluid being supplied to the small chamber of the boom cylinder as a regenerative hydraulic fluid via the passage formed axially in the first boom spool 2 and a passage 39.

At the same time, the part of the hydraulic fluid transferred to the passage 30 passes through a passage 31, and the passage 61 formed in the first boom valve block 1 at the inlet side of the boom booster poppet 32 to cause the poppet 62 to be shifted to the right on the drawing sheet. At this point, a valve spring 63 interposed between the poppet 62 and a plug 64 receives a compressive force. For this reason, the hydraulic fluid of the passage 61 is transferred to the passage 26 so as to be supplied to the small chamber of the boom cylinder as a regenerative hydraulic fluid.

In other words, a double regeneration of the hydraulic fluid can be performed by the poppet 37 coupled to the inside of the first boom spool 2 and the poppet 62 coupled to the passage 61 of the first boom valve block 1 so that the amount of the hydraulic fluid being supplied to the boom cylinder from the hydraulic pump side can be reduced, thereby increasing both an energy efficiency and a boom-down operation speed.

Meanwhile, a part of the hydraulic fluid transferred to the passage 30 maintains a balance with an elastic force of a valve spring 33 that elastically supports the poppet 32 slidably movable in a boom booster plug 34. At this point, the part of the hydraulic fluid of the passage 31 flow out of an orifice 46 and is returned to a tank passage 35.

On the other hand, when the boom-down pilot signal pressure is inputted to the port 16 of the holding valve block 15a, it exceeds an elastic force of a valve spring 19a mounted in the holding valve block 15a to cause a spool 18a to be shifted to the left on the drawing sheet. For this reason, a high pressure hydraulic fluid of the cylinder port 55 is introduced into the holding poppet 13a via an orifice 27a of the holding poppet 13a, and is partly drained to a drain port 17a via a passage 28a and a notch of the spool 18a.

In this case, since a lower portion of the holding poppet 13a is in a low pressure state, the high pressure hydraulic fluid of the cylinder port 50 cause the holding poppet 13a to be pressingly lowered to the bottom on the drawing sheet while exceeding the elastic force of the valve spring 14a. For this reason, the hydraulic fluid of the cylinder port 55 is transferred to a passage 31a via the passage 12a and a notch 29a of the shifted second boom spool 51, and then maintains a balance with an elastic force of a valve spring 33a that elastically supports a boom booster poppet 32a slidably movable in the boom booster plug 34a. At this point, a part of the hydraulic fluid of the passage 231a is returned to a tank passage 35a through an orifice 36a of the poppet 32a.

In the meantime, the cylinder port 55 is communicatingly connected to the large chamber of the boom cylinder through an external pipe so that leakage of the hydraulic fluid depending on a pressure of the large chamber of the boom cylinder can be prevented and a drift phenomenon of the boom cylinder can be avoided by the holding poppet 13a and the holding valve block 15a in the same manner as that of the holding poppet 13 of the first boom valve block 1.

As described above, a high flow rate of the hydraulic fluid is fed back to the cylinder port 21 of the first boom valve block 1 side and the cylinder port 55 of the second boom valve block 50 from the large chambers of two boom cylinders through the external pipes during the boom-down operation of the large-scale excavator. For this reason, the high flow rate of the hydraulic fluid being fed back from the large chambers of two boom cylinders is returned to the hydraulic tanks by halves via the booster poppets 32 and 32a of the first boom valve block 1 and the second boom valve block 50 during the boom-down operation. Resultantly, an excessive pressure loss and heat generation can be prevented during the boom-down operation and a smooth operation speed of the boom cylinder can be ensured during the boom-down operation of the boom cylinder.

INDUSTRIAL APPLICABILITY

In accordance with the present invention as constructed above, it is possible to solve a problem associated with the heat generation caused by the excessive pressure loss due to the returning of a high flow rate of hydraulic fluid from the boom cylinder only through the use of the first boom valve block during the boom-down operation of a medium or large scale excavator, and the hydraulic fluid being returned can be regenerated to improve a fuel efficiency. In addition, the boom-down operation speed can be increased, thereby improving manipulability.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

What is claimed is:

1. A flow rate control valve for a construction machine, which is configured to control the supply of a hydraulic fluid to a hydraulic actuator from first and second hydraulic pumps, the control valve comprising:
    a first boom valve block connected to the first hydraulic pump;
    a second boom valve block connected to the second hydraulic pump;
    a first boom spool slidably coupled to the first boom valve block and configured to be shifted by the supply of a pilot signal pressure to control the supply of the hydraulic fluid to a boom cylinder from the first hydraulic pump so as to perform a boom-up or boom-down operation;
    a second boom spool slidably coupled to the boom second valve block and configured to be shifted by the supply of the pilot signal pressure to control the supply of the hydraulic fluid to the boom cylinder from the second hydraulic pump so as to perform the boom-up or boom-down operation;
    a boom-up flow rate adjustment means configured to supply the hydraulic fluid from the first and second hydraulic pumps to a large chamber of the boom cylinder via the first and second boom spools and allow a part of the hydraulic fluid from the second hydraulic pump to join the hydraulic fluid being supplied from the first hydraulic pump to the large chamber of the boom cylinder via the second boom spool through the shift of the first boom spool when the first and second boom spools are shifted to perform the boom-up operation; and
    a boom-down flow rate adjustment means configured to allow a part of the hydraulic fluid being fed back from the large chamber of the boom cylinder to be returned to the hydraulic tank via the first and second boom spools and allow a part of the hydraulic fluid being fed back from the large chamber of the boom cylinder to join the hydraulic fluid on a small chamber side of the boom cylinder as a regenerative hydraulic fluid when the first and second boom spools are shifted to perform the boom-down operation;
    wherein the boom-up flow rate adjustment means allows the part of the hydraulic fluid from the second hydraulic pump to join the hydraulic fluid at the outside via the shifted second boom spool so as to be supplied to the large chamber of the boom cylinder, and allows the part of the hydraulic fluid from the second hydraulic pump to be supplied through a confluence line that fluidically communicates with a cylinder passage in the first boom valve block via a poppet installed in the second boom valve block to cause the part of the hydraulic fluid to join the hydraulic fluid that is supplied from the first hydraulic pump to the large chamber of the boom cylinder via the first boom spool; and
    wherein the boom-down flow rate adjustment means comprises:
    a regenerating poppet mounted on one side of the inside of the first boom spool to allow the part of the hydraulic fluid being fed back from the large changer of the boom cylinder to join the hydraulic fluid being supplied to the small chamber of the boom cylinder as the regenerative hydraulic fluid when the first boom spool is shifted;
    a boom booster poppet mounted on the first boom valve block in such a manner as to be positioned in a path along which the hydraulic fluid being fed back from the larger chamber of the boom cylinder returns to the hydraulic tank via the first boom spool during the boom-down operation, and configured to generate a back pressure to control the boom drop speed to prevent a boom from dropping down abruptly by its own weight during the boom-down operation; and
    a boom booster poppet mounted on the second boom valve block in such a manner as to be positioned in a path along which the hydraulic fluid being fed back from the larger chamber of the boom cylinder returns to the hydraulic tank via the second boom spool during the boom-down operation, and configured to generate a back pressure to control the boom drop speed to prevent a boom from dropping down abruptly by its own weight during the boom-down operation.

2. The flow rate control valve according to claim 1, wherein the boom-down flow rate adjustment means comprises a block regenerating poppet mounted in a passage formed on an inlet side of the boom booster poppet on the boom first valve block side, and configured to allow the part of the hydraulic fluid being fed back from the large chamber of the boom cylinder to join the hydraulic fluid being supplied to the small chamber of the boom cylinder as the regenerative hydraulic fluid during the boom-down operation.

3. The flow rate control valve according to claim 1, wherein the boom booster poppet on the second boom valve block side is mounted in a position in which a relief valve is mounted to return the hydraulic fluid to the hydraulic tank when an excessive pressure occurs due to the returned hydraulic fluid when the hydraulic fluid being fed back from the large chamber of the boom cylinder is returned to the hydraulic tank during the boom-down operation.

* * * * *